United States Patent
Yao et al.

(10) Patent No.: US 11,901,550 B2
(45) Date of Patent: Feb. 13, 2024

(54) CALCIUM-METAL ALLOY ANODE MATERIALS FOR REVERSIBLE CALCIUM-ION BATTERIES

(71) Applicant: Northwestern University, Evanston, IL (US)

(72) Inventors: Zhenpeng Yao, Skokie, IL (US); Christopher M. Wolverton, Wilmette, IL (US)

(73) Assignee: Northwestern University, Evanston, IL (US)

( * ) Notice: Subject to any disclaimer, the term of this patent is extended or adjusted under 35 U.S.C. 154(b) by 492 days.

(21) Appl. No.: 17/287,459

(22) PCT Filed: Oct. 22, 2019

(86) PCT No.: PCT/US2019/057345
§ 371 (c)(1),
(2) Date: Apr. 21, 2021

(87) PCT Pub. No.: WO2020/086524
PCT Pub. Date: Apr. 30, 2020

(65) Prior Publication Data
US 2021/0384494 A1    Dec. 9, 2021

Related U.S. Application Data

(60) Provisional application No. 62/750,316, filed on Oct. 25, 2018.

(51) Int. Cl.
*H01M 4/38*        (2006.01)
*C22C 24/00*      (2006.01)
(Continued)

(52) U.S. Cl.
CPC ............ *H01M 4/381* (2013.01); *C22C 24/00* (2013.01); *H01M 10/054* (2013.01); *H01M 2004/027* (2013.01)

(58) Field of Classification Search
None
See application file for complete search history.

(56) References Cited

U.S. PATENT DOCUMENTS 3,980,495 A    9/1976   Roche et al.
4,474,863 A   10/1984   Behl
(Continued)

FOREIGN PATENT DOCUMENTS

WO    WO 2016/050331 A1    4/2016

OTHER PUBLICATIONS

The International Search Report and the Written Opinion dated Jan. 14, 2020 for International Patent Application No. PCT/US19/57345; pp. 1-11.

(Continued)

*Primary Examiner* — Wyatt P Mcconnell
(74) *Attorney, Agent, or Firm* — Bell & Manning, LLC

(57) ABSTRACT

Calcium ion batteries are provided. The calcium ion batteries include a cathode, an alloying anode composed of one or more intermetallic calcium compounds in electrical communication with the cathode; and an electrolyte disposed between the anode and the cathode. The intermetallic calcium compounds are intermetallic compounds of calcium and transition metals and metalloids.

14 Claims, 10 Drawing Sheets

(51) Int. Cl.
H01M 10/054 (2010.01)
H01M 4/02 (2006.01)

(56) References Cited

U.S. PATENT DOCUMENTS 8,323,816 B2 12/2012 Bradwell et al.
2014/0113181 A1* 4/2014 Bradwell ............ H01M 50/204
429/163

OTHER PUBLICATIONS

Walker Jr., "Calcium Thionyl Chloride Cells: Anode Studies at Low Temperatures," *Journal of Power Sources*, vol. 25, Issue 1, Jan. 1989, pp. 13-25.
Ouchi et al., "Calcium-Antimony Alloys as Electrodes for Liquid Metal Batteries," *Journal of the Electrochemistry Society*, vol. 161, Issue 12, Sep. 9, 2014, pp. A1898-A1904.
Alexander et al., "The Silver-Calcium Phase Diagram," *Canadian Journal of Chemistry*, vol. 47, Issue 4, Feb. 1969, pp. 611-614.
Yao et al., "Discovery of Calcium-Metal Alloy Anodes for Reversible Ca-Ion Batteries," *Advanced Energy Materials*, vol. 9, Issue 9, Article No. 1802994, Jan. 11, 2019; pp. 1-10.
Tran, et al., "Alloy negative electrodes for high energy density metal-ion cells." *Journal of The Electrochemical Society*, vol. 158, No. 12, (2011); pp. A1411-A1416.
Ponrouch, Alexandre, et al. "Assessing Si-based anodes for Ca-ion batteries: Electrochemical decalciation of CaSi2," *Electrochemistry Communications*, vol. 66, (2016); pp. 75-78.
Meng Wang et al., "Reversible calcium alloying enables a practical room-temperature rechargeable calcium-ion battery with a high discharge voltage," *Nature Chemistry*, vol. 10, Jun. 2018; pp. 667-672.
John Rogosic, Thesis: "Towards the Development of Calcium Ion Batteries," Submitted to the Department of Materials Science and Engineering in partial fulfillment of the requirements for the degree of Doctor of Philosophy at Massachusetts Institute of Technology, Jun. 2014; pp. 1-190.
Gummow et al., "Calcium-Ion Batteries: Current State-of-the-Art and Future Perspectives," *Adv. Mater.* 2018, vol. 30; pp. 1801702 (1 of 14).
D. S. Tchitchekova et al., "On the Reliability of Half-Cell Tests for Monovalent (Li+, Na+) and Divalent (Mg2+, Ca2+) Cation Based Batteries," *Journal of the Electrochemical Society*, (2017), vol. 164, No. 7; pp. A1384-A1392.
Albert L. Lipson et al., "Rechargeable Ç-ion Batteries : A New Energy Storage System," pp. 1-8.

* cited by examiner

CALCIUM-METAL ALLOY ANODE MATERIALS FOR REVERSIBLE CALCIUM-ION BATTERIES

CROSS-REFERENCE TO RELATED APPLICATIONS

This application is a National Stage of International Application No. PCT/US19/57345, filed Oct. 22, 2019, which claims the priority benefit of U.S. Provisional Patent Application No. 62/750,316, filed Oct. 25, 2018, the entire disclosures of which are incorporated by reference herein.

REFERENCE TO GOVERNMENT RIGHTS

This invention was made with government support under grant number DE-AC02-06CH11357 awarded by the U.S. Department of Energy. The government has certain rights in the invention.

BACKGROUND

The usage of renewable energy, coupled with the growing application of electric vehicles (EVs), demand energy storage techniques with high energy density and low cost. Multivalent batteries, like Mg-ion, Ca-ion, and Al-ion batteries, have the potential to realize significantly improved capacities compared to monovalent batteries (e.g. Li-ion batteries), due to more electrons carried per ion. Among them, Ca-ion batteries (CIBs) have drawn special attention with merits besides the capacity enhancement, including: 1) $Ca/Ca^{2+}$ has a reduction potential (−2.87 V) only slightly higher than that of $Li/Li^+$ (−3.04 V), yet much lower than that of $Mg/Mg^{2+}$ (−2.36 V) and $Al/Al^{3+}$ (−1.68 V), which provides CIBs the prospect to function at voltages comparable with Li-ion batteries and much higher than the counterparts of Mg-ion and Al-ion batteries; 2) Ca is the fifth most abundant element in the earth's crust with an extensive global resource distribution, in contrast to lithium; and 3) The kinetics of Ca-ion in solid electrodes are faster than Mg- and Al-ions due to reduced charge density.

The development of CIBs was originally pioneered by the study of Ca-ion electrochemical intercalations into layered transition metal (TM) oxides and sulfides. Subsequently, many efforts were made to search for cathode materials which will tolerate a large number of Ca-ions being reversibly extracted/re-accommodated upon charge/discharge. Material systems including Prussian blue compounds, Chevral phases, spinels, perovskites, layered TM sulfides, and iron phosphate were suggested to be effective Ca-ion electrodes. Distinct from these TM based electrodes, a graphite cathode, which functions via the (de-) intercalation of electrolyte salt anions (e.g., $A^-=PF_6^-$, $ClO_4^-$) upon charge/discharge has been used.

Unlike the continuous development of CIB cathode materials, studies focusing on anodes have been relatively scarce. The pursuit of a calcium metal anode is currently hindered by the lack of an effective electrolyte to plate/strip calcium metal at room temperature in an adequate voltage window. Also, $Ca^{2+}$ diffusion can be extremely sluggish through the as-formed solid electrolyte interphase (SEI) between the calcium metal anode and the electrolyte.

Sn and several other metals and metalloids, including Zn, Al, Si, Li, and Na, have been investigated for the use of alloying-type CIB anodes with largely disparate capacities achieved. (See, e.g., Lipson, A. L., et al., Chem. Mater. 2015, 27 (24), 8442-8447; Wang, M., et al., Nat. Chem. 2018, 10 (6), 667-672; Tran, T. T., et al., J. Electrochem. Soc. 2011, 158 (12), A1411-A1416; and Ponrouch, A., et al., Electrochem. commun. 2016, 66, 75-78.) All of them except Na have been reported to mix with Ca in wide composition ranges, forming various intermetallic compounds. (See, e.g., Vrana, L. M., In Kirk-Othmer Encyclopedia of Chemical Technology; John Wiley & Sons, Inc.: Hoboken, N.J., USA, 2011; pp 1-10.)

SUMMARY

CIBs are provided. In some embodiments, the CIBs include an anode comprising an intermetallic compound of calcium and a metal or metalloid, wherein the metal or metalloid is Sb, As, Cu, Cd, $CdCu_2$, Bi, Ag, Au, Pd, Pt, or Hg; a cathode in electrical communication with the anode; and an electrolyte comprising a calcium salt disposed between the anode and the cathode.

BRIEF DESCRIPTION OF THE DRAWINGS

Illustrative embodiments of the invention will hereafter be described with reference to the accompanying drawings.

FIG. 2A shows the Sn—Ca convex hull with all the known Sn—Ca intermetallic compounds predicted to be on or slightly (<10 meV/atom) above the convex hull. Structures for Sn, Ca, and all the intermetallic compound are shown in FIG. 2D. FIG. 2B shows the corresponding voltage profile during the calcination process of Sn. Experimentally observed calcination ended at $Ca_7Sn_6$ before the voltage profile reached the last plateau of 0.53 V, which can be seen as the threshold voltage of calcination. FIG. 2C shows the calculated volume expansion per Ca as a function of calcination.

FIG. 3A shows the Zn—Ca, Li—Ca, and Na—Ca convex hulls. FIG. 3B shows the corresponding voltage profiles during the calcination of Zn and Li. FIG. 3C shows calculated volume expansions per Ca upon calcination of Zn and Li. Compared with the Sn—Ca convex hull, the bottom of the Zn—Ca convex hull deviated to the Zn side with rapidly decreased formation energy in a small Ca concentration range, indicating a fast voltage declining and loss of reaction driving force. Similarly, the extremely shallow feature of the Li—Ca convex hull implies a low voltage and inadequate reaction driving force. No stable intermetallic compound is identified for the Na—Ca convex hull, reflecting the fact of no solubility of Ca in Na.

FIG. 5A shows averaged voltages and gravimetric capacities, and FIG. 5B shows the volumetric capacities of all the 115 M-Ca systems. The shading of each marker indicates the volume expansion per Ca corresponding to the final product of specific M-Ca system.

DETAILED DESCRIPTION

Figure 1:
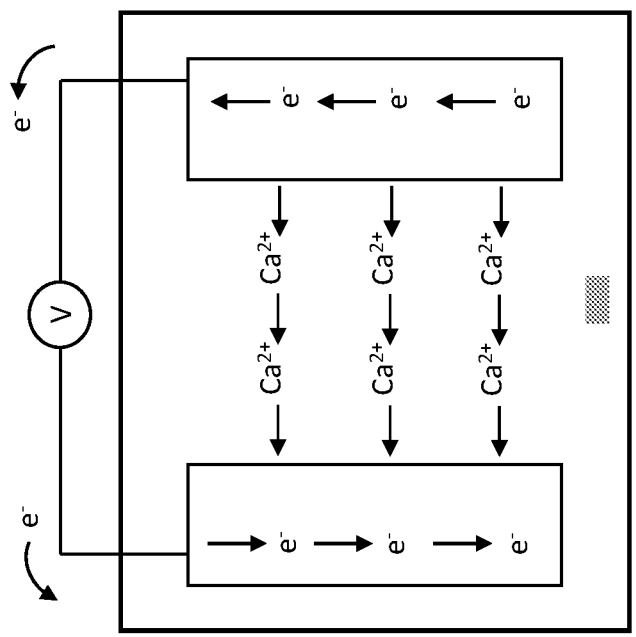
FIG. 1 is a schematic diagram of one embodiment of a CIB.
Figure 1:
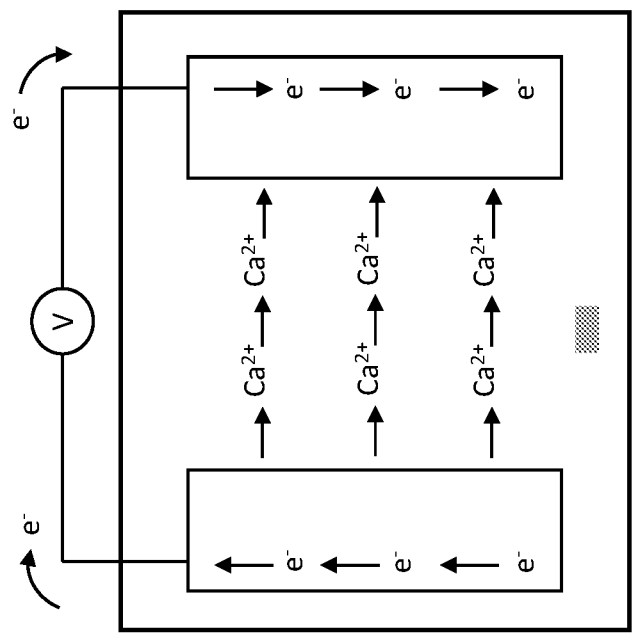

CIBs are provided. One embodiment of a CIB is shown in FIG. 1. An embodiment of a CIB includes: a cathode 104; an alloying anode 102 comprising intermetallic calcium compounds in electrical communication with the cathode; and an electrolyte 106 disposed between the anode and the cathode. The batteries can be used to power devices such as consumer electronics and electric vehicles and have applications in distributed energy storage for solar and wind energy and electric energy storage for the smart grid.

The anodes are composed of an active anode material that takes part in a reversible decalcination reaction during the operation of the battery, whereby the intermetallic compound of the anode 102 releases $Ca^{2+}$ cations during a discharge cycle (FIG. 1, left panel) and recaptures $Ca^{2+}$ during a charge cycle (FIG. 1, right panel). The active anode material may be disposed on an electrically conductive support substrate. The intermetallic compounds are compounds that include calcium and a metalloid, compounds that include calcium and a post-transition metal, and compounds that include calcium and a noble metal. The metals and metalloids include elements from group 15 of the periodic table (pnictogens), such as arsenic, antimony, and bismuth, and transition metal elements from groups 10, 11, and 12 of the periodic table, such as palladium, gold, copper, silver, cadmium, and mercury. Thus, in some embodiments of the anodes, the metalloid or metal of the intermetallic compounds are selected from Sb, As, Cu, Cd, $CdCu_2$, Bi, Ag, Au, Pd, Hg, and mixtures thereof. Typically, the intermetallic compounds of the anodes will be pre-synthesized for use as the anode material. Alternatively, the anode material could initially be a pure metal, including, for example, one of the metals listed above, and the intermetallic calcium compounds could be formed by $Ca^{2+}$ reduction during an operation of the battery.

The electrolytes are ionically conductive materials that allow for the reversible alloying and dealloying of $Ca^{2+}$ cations in the alloying anodes. The electrolytes may be solid state or non-aqueous liquid electrolytes. When liquid electrolytes are used, the CIB may further include a separator disposed between the anode and the cathode. The separators are typically thin, porous or semi-permeable, insulating films with high ion permeabilities. The non-aqueous electrolytes include calcium salts dissolved in one or more organic solvents. Organic solvents that may be used in the electrolytes can include, for example, alkyl carbonates (e.g., propylene carbonate and/or ethylene carbonate), dialkyl carbonates (e.g., dimethyl carbonate and/or diethyl carbonate), cyclic carbonates, cyclic esters, cyclic ethers, alkyl ethers, nitriles (e.g., acetonitrile), tetrahydrofuran, 2-methyltetrahydrofuran, γ-butyrolactone, and γ-valerolactone. Examples of calcium salts that may be included in the electrolytes include $Ca(BF_4)_2 Ca(ClO_4)_2$, $Ca(PF_6)_2$, and $Ca(CF_3SO_3)_2$. Typical salt concentrations in the non-aqueous electrolytes lie in the range from about 0.05 M to 2 M. However, concentrations outside of these ranges can be used.

The cathodes 104 are composed of an active cathode material that takes part in a reversible calcination reaction during the operation of the battery. The active cathode material may be disposed on an electrically conductive support substrate. Examples of cathode materials for CIBs include carbon materials, such as graphite; Prussian blue analogs (e.g., compounds having the formula $A_xMFe(CN)_6 \cdot yH_2O$ where A=Li, Na, Mg, or Ca, etc. and M=Ba, Ti, Mn, Fe, Co or Ni); Chevral phases, such as $CaMo_6X_8$ (X=S, Se, or Te); spinels, such as $CaMn_2O_4$; perovskites, such as $CaMO_3$ (M=Mo, Cr, Mn, Fe, Co, and Ni) compounds; layered TM oxides, such as $V_2O_5$; layered TM sulfides; and iron phosphate. Examples of materials that can be used as cathodes in CIBs can be found in Gummow et al., *Adv. Mater.* 2018, 30, 1801702.

The Example below illustrates the means for identifying intermetallic calcium compounds for use as anodes in secondary calcium batteries and demonstrates their electrochemical properties and performance.

EXAMPLE

This example describes the use of density functional theory (DFT) to investigate the Sn—Ca electrochemical alloy reaction process via constructing the ground state Sn—Ca phase diagram and exploring the reaction driving force evolution as a function of Ca-ion accommodated. The convex hull characteristics favored by large capacity alloy-type anodes were identified, and by comparison between the DFT calculations and electrochemical measurements of CIB cells, threshold voltages which limit the extent of calcination reactions in real cells were defined by examining the alloy reaction of Ca and Zn, Li, and Na. Moreover, a four-step screening strategy was designed, and HT-DFT calculations were used to explore the M-Ca alloying space to search for anode materials with higher energy density and constrained volume expansion. Based on the calculation results, it is concluded that many metalloids (Si, Sb, Ge), (post-)transition metals (Al, Pb, Cu, Cd, $CdCu_2$, Ga, Bi, In, Tl, Hg), and noble metals (Ag, Au, Pt, Pd) are suitable anode materials for CIBs.

Methodology
First-Principles DFT Calculations

All the first-principles calculations were performed via the Vienna Ab-initio Simulation Package (VASP) within the projector augmented wave (PAW) formalism, and the Perdew-Becke-Ernzerhof (PBE) approximation to the exchange-correlation potential was employed. (See, e.g., Kresse, G., et al., *Phys. Rev. B* 1993, 47, 558-561; Kresse, G., et al., *Phys. Rev. B* 1994, 49 (20), 14251-14269; Kresse, G., et al., *Comput. Mater. Sci.* 1996, 6, 15-50; Kresse, G., et al., *Phys. Rev. B* 1996, 54 (16), 11169-11186; Blöchl, P. E., et al., *Phys. Rev. B* 1994, 50 (24), 17953-17979; and Perdew, J. P., et al., *J Chem. Phys.* 1996, 105 (22), 9982-9985.) A plane wave basis was used with a cutoff energy of 520 eV, and Γ-centered k-meshes were used with a density of 8000 k-points per reciprocal atom. All the calculations reported in this study were conducted under the framework of the Open Quantum Materials Database (OQMD). (See, e.g., Kirklin, S., et al., *npj Comput. Mater.* 2015, 1, 15010-15024; and Saal, J. E., et al., *JOM* 2013, 65 (11), 1501-1509.)

Voltage Profile Calculations: Calcination Voltage and Output Voltage

Calcination Voltage V of M-Ca Anode

The averaged M-Ca electrochemical alloy reaction voltages (calcination voltage, relative to Ca/Ca$^{2\pm}$) were evaluated by calculating the reaction free energy per Ca added/removed, as shown in Eq. 1. (See, e.g., Aydinol, M. K., et al., *Phys. Rev. B* 1997, 56 (3), 1354-1365; and Wolverton, C., et al., *Phys. Rev. Lett.* 1998, 81 (3), 606-609.)

$$V = \frac{\Delta G_f}{2F\Delta N_{Ca}} \quad (1)$$

where F is the Faraday constant, $\Delta N_{Ca}$ is the amount of Ca added/removed, 2 is the amount of charges carried per single Ca, and $\Delta G_f$ is the molar free energy change during the reaction. Assuming that the calcination proceeds through a two-phase reaction between Ca$_x$M and M: M+xCa→Ca$_x$M, $\Delta G_f$ can be approximated by the total internal energy changes from DFT calculations (0 K), $$\Delta E = E(Ca_xM) - E(M) - xE(Ca_{metal}) \quad (2)$$

where E(Ca$_x$M) and E(M) are the DFT energies at the respective compositions. Entropic contributions were neglected, and the reaction voltage profiles therefore followed the T=0K ground state convex hull and consisted of a series of constant voltage steps along the two-phase regions of the convex hull, separated by discontinuities indicating the single phase compounds on the hull. It is noteworthy that electrochemical M-Ca reactions do not necessarily proceed through two-phase reactions in practice. Thus, the calculated T=0K voltage profiles should be viewed as an approximation to the actual voltage profiles. The voltage drops in the profile become more rounded at finite temperatures (e.g., room temperature), due to finite temperature effects.

Output Voltage $V_{output}$ of CIBs Using the M-Ca Anode

During the discharge of CIBs, the M-Ca alloy anode, which was the focus of this study, experiences a decalcination reaction (corresponding voltage: −V) while the corresponding cathode experiences a calcination reaction (corresponding voltage: $V_{cathode}$). Upon charging, the reverse reactions occur. The output voltage of a complete CIB cell containing both cathode and anode upon discharge then can be defined as follows:

$$V_{output} = V_{cathode} - V \quad (4)$$

where the anode voltage V can be calculated using Eq. 1. To calculate the output voltage and then evaluate the energy densities of CIBs using anodes discovered in this study, a value of $V_{cathode}$=5.2 V was assumed, consistent with the recent report of a graphite-based cathode material. (See, e.g., Read, J. A., et al., *Energy Environ. Sci.* 2014, 7 (2), 617-620.)

Anodes with lower calcination voltage V were favored to maximize the $V_{output}$ of the CIB, yet V should not be too low to ensure enough driving force for the reversed calcination reaction to happen on charge.

Volume Expansion Evaluations

The volume expansion upon the calcination of M was computed via calculating the volume change per Ca added as shown in Eq. 3:

$$U = \frac{u_{Ca_xM} - u_M}{x} \quad (3)$$

where $u_{Ca_xM}$ and $u_M$ are the volumes of Ca$_x$M and M, respectively, and x is the amount of Ca.

Capacity and Energy Density Calculations

The gravimetric and volumetric capacity of the M-Ca alloy anode corresponding to a given voltage plateau (a given two-phase reaction) can be calculated according to Eq. 5 and Eq. 6:

$$C_g(V) = \frac{2\Delta N_{Ca}(V)F}{m_M} \quad (5)$$

$$C_u(V) = \frac{2\Delta N_{Ca}(V)F}{u_M} \quad (6)$$

where F is the Faraday constant, $\Delta N_{Ca}$ (V) is the amount of Ca added/removed corresponding to the voltage plateau, 2 is the amount of charge carried per single Ca, and $m_M$ and $u_M$ are the mass and volume of M, respectively.

The energy density $E_g(V)$ and specific energy $E_E(V)$ of the CIBs using the M-Ca alloy anode then can be calculated by integrating the volumetric capacity $C_g(V)$ and gravimetric capacity $C_u(V)$ as a function of output voltage $V_{voltage}$ as shown in Eq. 7 and Eq. 8:

$$E_g(V) = \int_{V}^{V_0} C_g(V_{cathode} - V')dV' \quad (7)$$

$$E_u(V) = \int_{V}^{V_0} C_u(V_{cathode} - V')dV' \quad (8)$$

where $V_0$ is the lower limit of the M calcination voltage profile.

Results and Discussions

Sn—Ca Phase Diagram and the Electrochemical Sn—Ca Reactions

Phase diagrams represent the thermodynamic phase equilibria of multicomponent systems and provide useful information on the electrochemical reactions between phases. The ground state convex hull represents the T=0 K limit of the thermodynamic phase diagram and gives information about the ground state stability of compounds in a given system. Here, M-Ca T=0 K phase diagrams were built using structures with the lowest energy for each composition, with M being metal/metalloids elements and their binary alloys. All the compounds were adopted from the ICSD, and corresponding calculations were carried out under the framework of OQMD. (See, e.g., Belsky, A., et al., *Acta Crystallogr. Sect. B Struct. Sci.* 2002, 58 (3), 364-369; Kirklin, S., et al., *npj Comput. Mater.* 2015, 1, 15010-15024; and Saal, J. E., et al., *JO/112013*, 65 (11), 1501-1509.) Using these convex hulls, the electrochemical calcination process of Sn was analyzed and the driving force variations were examined to determine the calcination maximums for the Sn anode. Then, the hypothesis was validated in other typical systems, including Zn, Li, and Na.

Figure 2A:
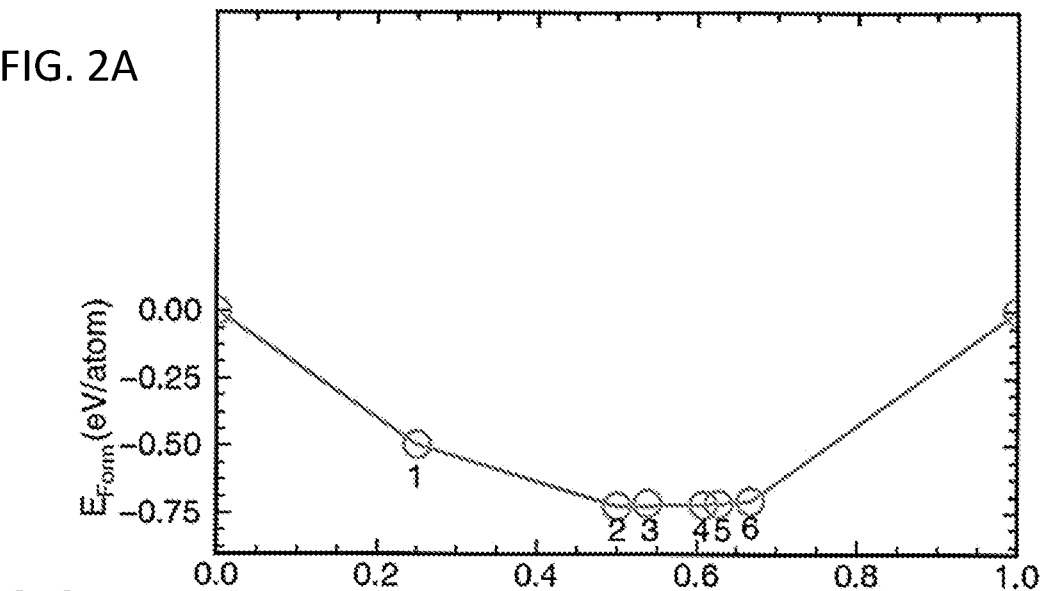
FIGS. 2A-2D show the electrochemical calcination process of Sn.
Figure 2B:
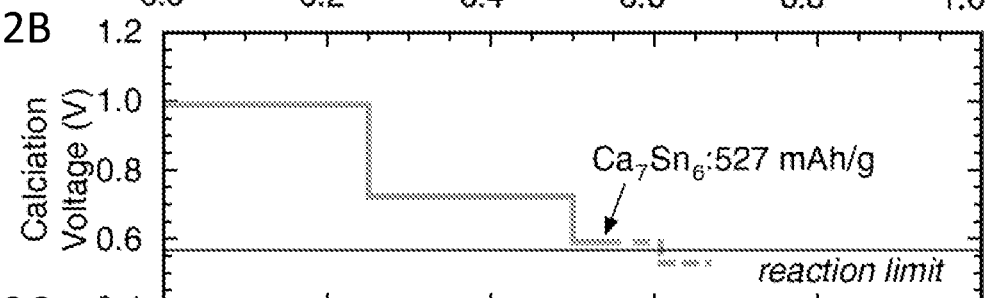
Figure 2C:
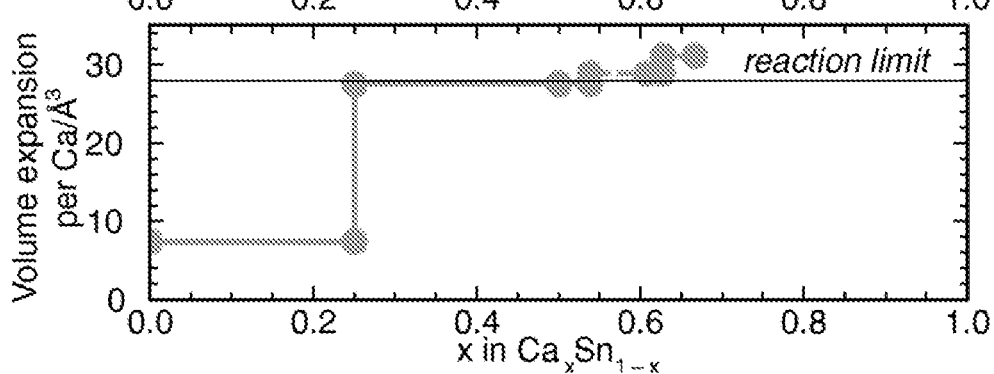
Figure 2D:
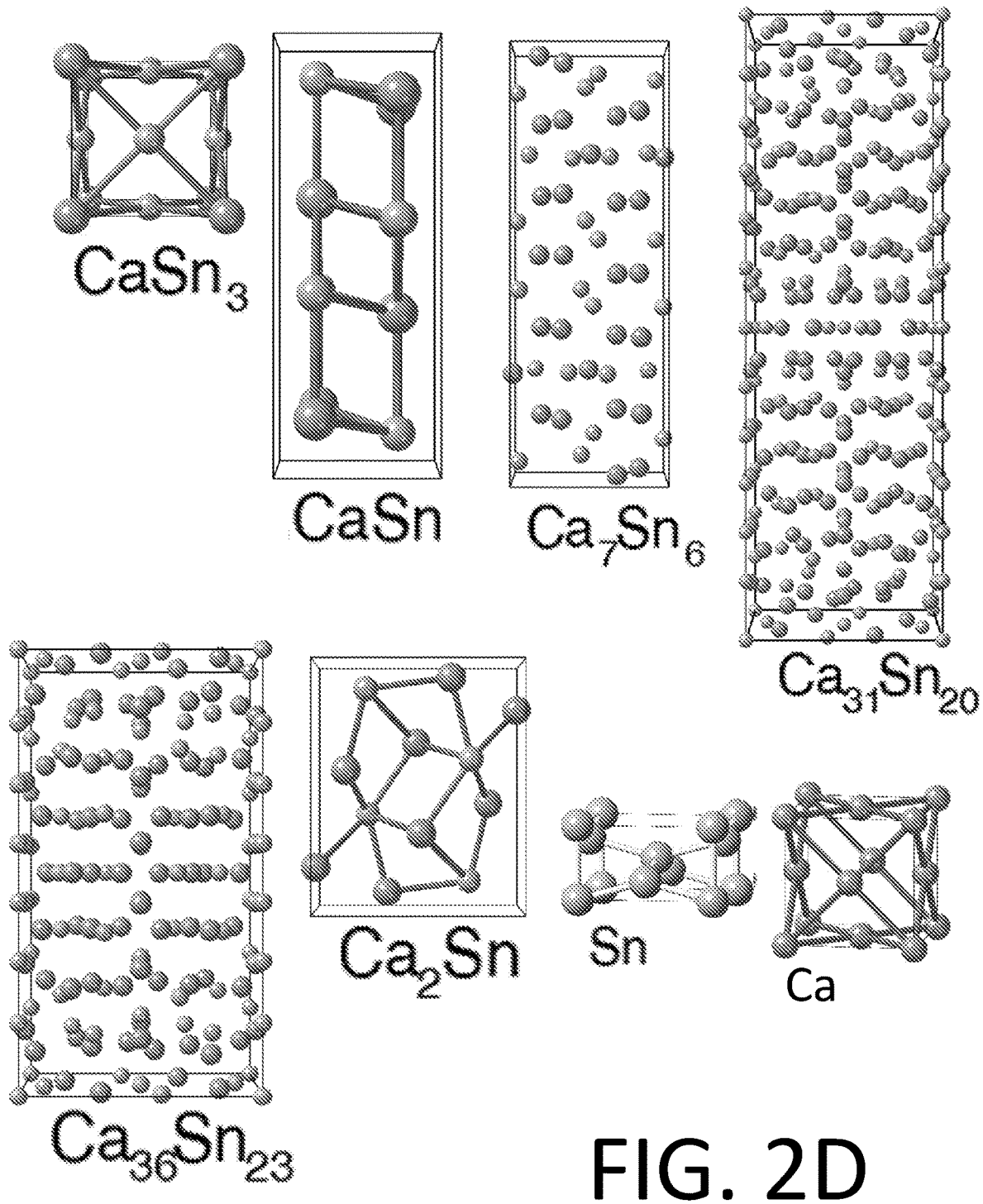

The calculated Sn—Ca convex hull is shown in FIG. 2A. All the known intermediate phases in the experimental phase diagram were identified, including $CaSn_3$, CaSn, $Ca_7Sn_6$, $Ca_{31}Sn_{20}$, $Ca_{36}Sn_{23}$, and $Ca_2Sn$ (FIG. 2D) as either on the hull or slightly (<10 meV/atom) above the hull. (See, e.g., Palenzona, A., et al. *J. Alloys Compd.* 2000, 312 (1-2), 165-171.) The calcination voltages corresponding to these phases declined from 0.99 V, 0.72 V, 0.59 V, to 0.53 V relative to $Ca/Ca^{2+}$ (FIG. 2B) while the volume expansions of the system per Ca accommodated increased from 7.4 $Å^3$, 27.5 $Å^3$, 27.6 $Å^3$, 28.8 $Å^3$, 31.1 $Å^3$ (FIG. 2C). By comparison with experimental electrochemistry data, a cutoff for the allowed calcination driving force can be determined, below which the reaction will not proceed in practice. For instance, the experimental calcination of Sn ends at $Ca_7Sn_6$, and the calculated voltage of the Sn—Ca system (FIG. 2B) reaches a value of 0.53V (relative to $Ca/Ca^{2+}$) for $Ca_7Sn_6$. Hence, this comparison was used to hypothesize that the driving force for calcination of anodes should be no less than 0.53 V. The use of this driving force limit was then validated to determine the calcination extent of Zn, Li, and Na (and other metals) and compared with the experimental measurements below. The shape of the convex hull can have a profound impact on the extent of calcination. The Sn—Ca convex hull features a relatively steep decreasing energy on the Sn-rich side. The fast decrease in formation energy with increasing Ca content corresponds to high calcination voltages and a large reaction driving force, while the "length" (in Ca content) of this segment of the convex hull indicates that a large amount of Ca ions react with the anode when the driving force is large. In contrast, convex hulls which feature short or shallow decreasing segments on the Ca-poor side indicate a weak driving force, or small Ca capacity, and potentially point to a hasty end to calcination.

Ca—Zn, Li, Na Phase Diagrams and the Electrochemical Calcination Limits

Figure 3A:
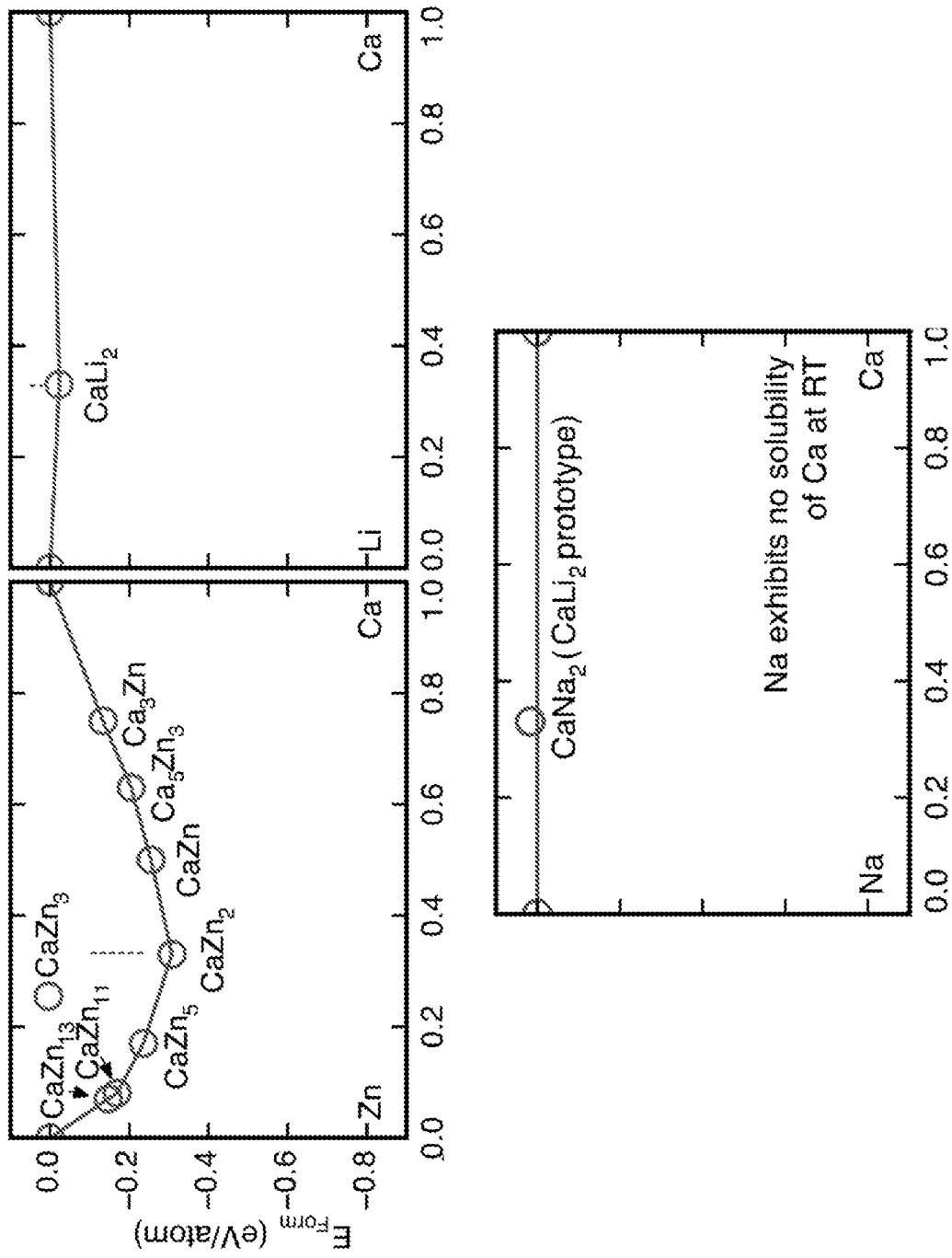
FIGS. 3A-3C show the electrochemical calcination processes of Zn, Li, and Na and the determination of the M-Ca alloy anode calcination threshold voltage.
Figure 3B:
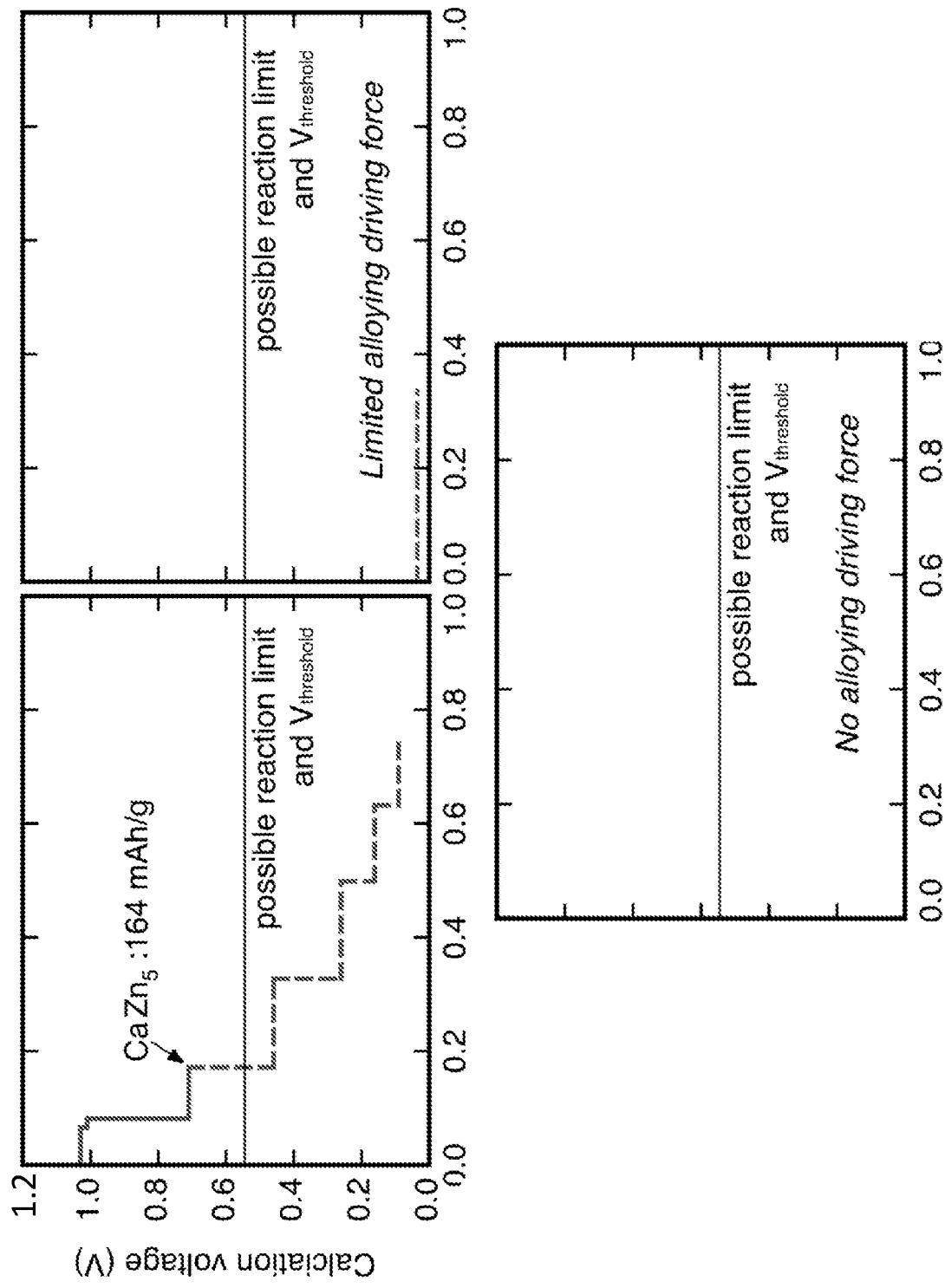
Figure 3C:
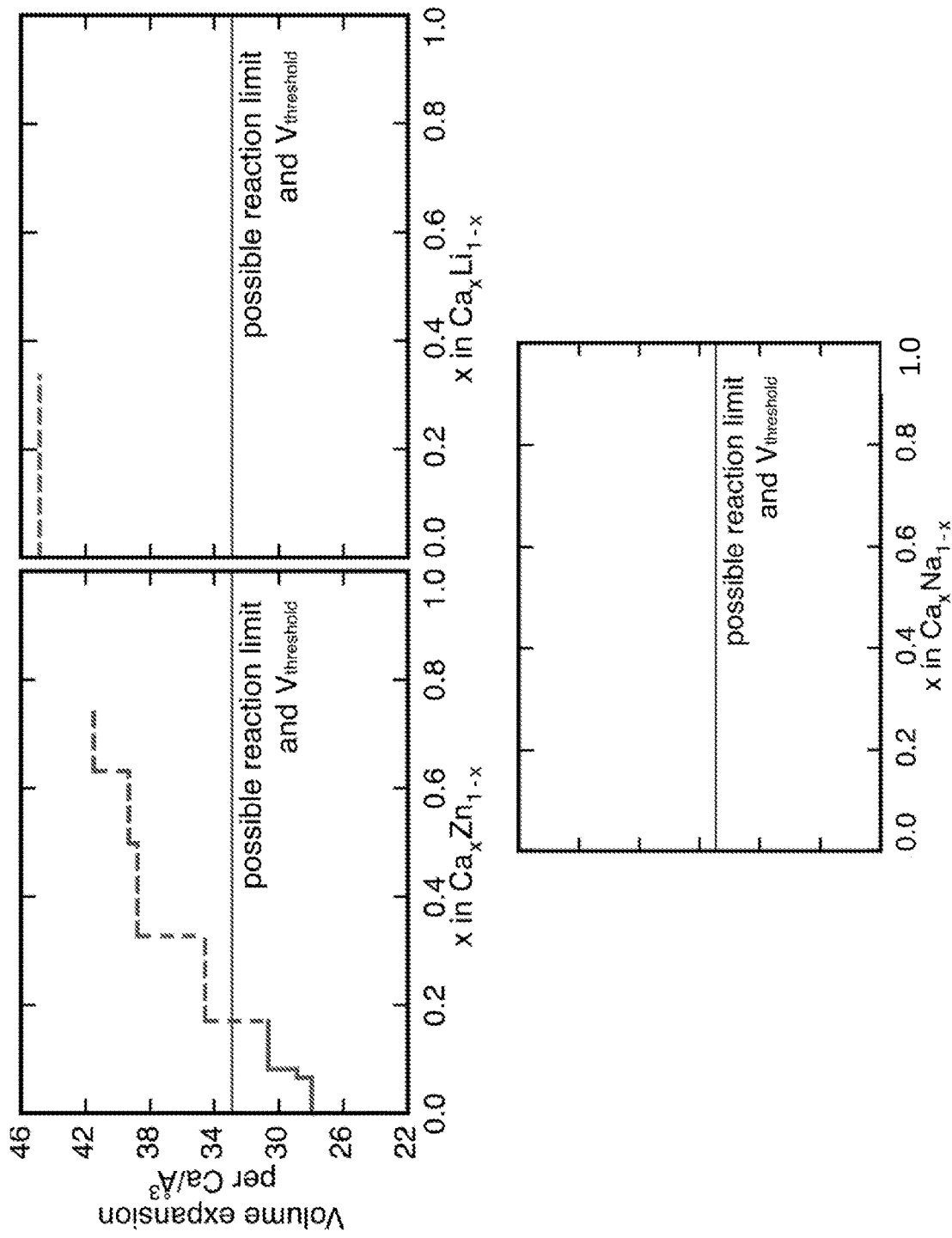

Having determined a voltage threshold in the Sn—Ca system, convex hulls in the Zn—Ca, Li—Ca, and Na—Ca systems were then constructed, as shown in FIG. 3A. The DFT calculations show nearly all experimentally observed intermediate compounds on the hull (except $CaZn_3$ which was excluded because its reported crystal structure exhibits partial occupancies). Na is reported to show no solubility in Ca with no intermetallic compound reported. As a simple test of the immiscibility and lack of compound formation in this system, $Li_2Ca$ was used as a prototype and the corresponding $Na_2Ca$ energy was calculated. The phase is above the hull, consistent with the lack of observed compounds in this system. The Zn—Ca convex hull is asymmetric with low energies on the Zn-rich side, and formation energy of $Ca_xZn$ rapidly decreases for small Ca concentrations (0<x<0.33). As a result, the calcination voltage quickly falls from 1.03 V to 0.46 V (FIG. 3B) in the same concentration range. If the voltage threshold derived from the Sn—Ca system (0.53V) is applied to the Zn—Ca system, then its calcination can be predicted to end at x=0.167 ($CaZn_5$) and before x=0.33 ($CaZn_2$), indicating a very limited calcination and capacity. These predictions are consistent with experimental observations, thus validating the use of the voltage threshold. (See, e.g., Wang, M., et al., *Nat. Chem.* 2018, 10 (6), 667-672.) Zn also exhibits a larger volume expansion per Ca of 31.26 $Å^3$ than Sn started at an early calcination step (x=0.167), as shown in FIG. 3C. For the calcination reaction of Li, because the convex hull is extremely shallow with very small (negative) formation energies and thus a low voltage of 0.03 V (FIG. 3B), the Li—Ca voltage is therefore significantly lower than the threshold voltage value (0.53 V). Hence Li—Ca is predicted to exhibit very low reversible capacity, also in agreement with experimental observations, and therefore validating the use of the threshold. (See, e.g., Wang, M., et al., *Nat. Chem.* 2018, 10 (6), 667-672.) Na has no solubility in Ca and no stable intermediate phases, which is consistent with its poor calcination performance. (See, e.g., Wang, M., et al., *Nat. Chem.* 2018, 10 (6), 667-672.) In order to obtain a significant calcination capacity, one should search for M-Ca convex hulls with long and fast decreasing segments to the M-rich side to ensure large capacity with a high driving force. Having validated the strategy, the threshold voltage combined with HT-DFT of a large number of alloying-type anode calcination reactions were used to discover novel anodes with promising electrochemical properties.

HT-DFT Screening for High-Performance Novel Calcium Alloy Anodes

Figure 4:
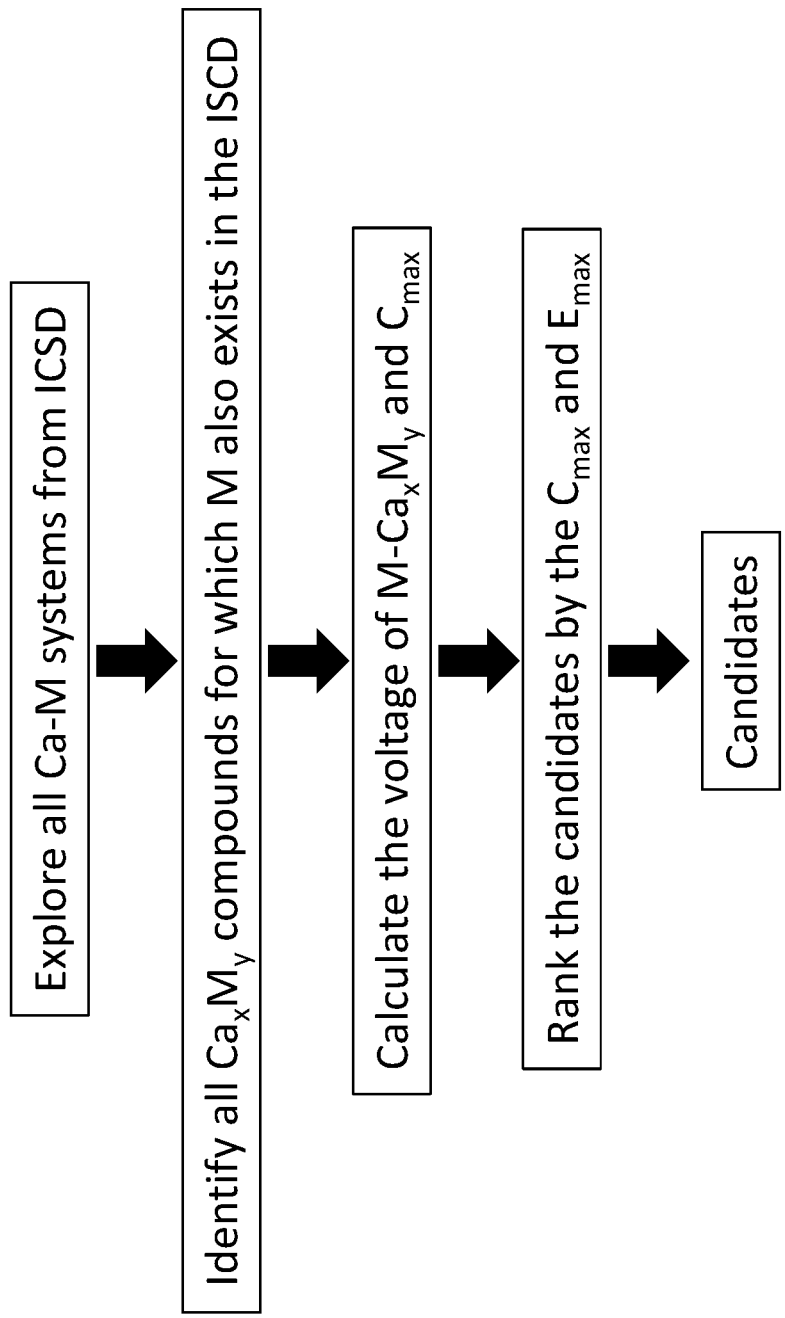
FIG. 4 shows a screening strategy for the search of calcium-metal alloy anodes. The high-throughput screening followed a four-step strategy. Starting with all the compounds in the Inorganic Crystal Structure Database (ICSD), the M-Ca alloys for which M also exists in the ICSD, wherein M can be a metal element or an alloy of metal elements. The reaction voltage profiles were then calculated for each M-Ca system, and the maximum capacities ($C_{max}$) were also determined. Lastly, the energy densities ($E_{max}$) corresponding to $C_{max}$ of all the systems were evaluated, and the systems were ranked based on their $E_{max}$ values. The ones with highest energy densities were selected as top candidates.
Figures 5A, 5B:
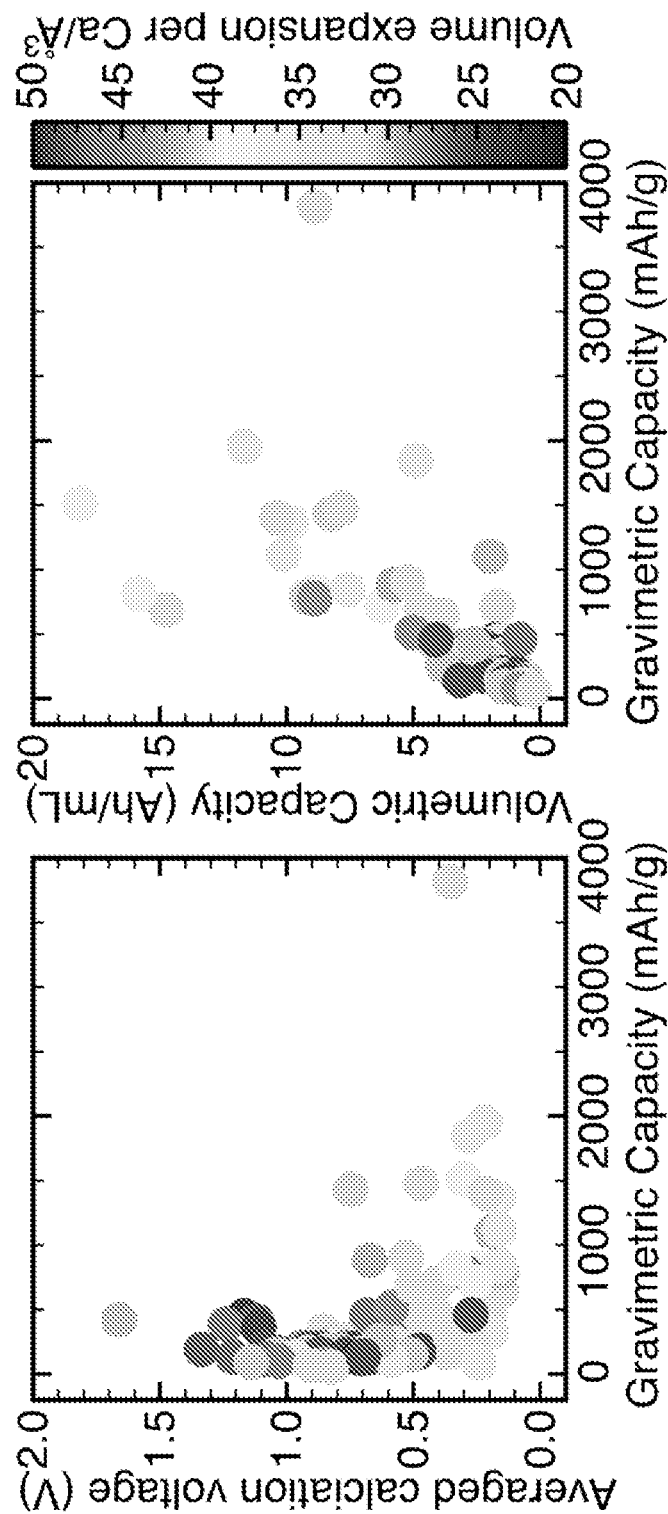
FIGS. 5A-5B show a summary of the identified M-Ca systems and corresponding properties.

Ca forms alloys with many metals and metalloids. This fact, along with the threshold voltage above, was used to design a four-step screening strategy and apply it to search for the high electrochemical property anodes as shown in FIG. 4. The four steps are: (i) The screening was initiated by identifying all the binary and ternary Ca intermetallic compounds from the ICSD. (See, e.g., Belsky, A., et al., *Acta Crystallogr. Sect. B Struct. Sci.* 2002, 58 (3), 364-369.) Quaternary or higher order Ca alloys were excluded because of the potentially more complex mass transport (and hence sluggish kinetics) during their calcination and decalcination. In total, 357 unique M-Ca compounds were identified. (ii) We then examined all the $Ca_xM$ compounds and checked the existence of counterparts with the same stoichiometry, but with Ca removed, i.e., M. If both of them exist in the ICSD, the $Ca_xM$ compound can be seen as the calcination product of M, where M is either simply a metal/metalloid element (e.g., Sn) or a binary intermetallic compound $M_aM'_b$ (e.g., CuAu). This screen results in a pool of 115 M-Ca systems with a various number of calcination reactions. (iii) Next, calcination voltages and volumetric capacities for calcination reactions of all 115 M-Ca systems were calculated as summarized in FIGS. 5A-5B. To determine the practical extent of the calcination reactions of each M-Ca system and also its maximum capacity, the threshold calcination voltages were applied to all the M-Ca systems. Two factors were considered to define the threshold calcination voltages: calcium metal plating and the practical calcination limit (discussed above). Anode calcination potentials lower than $Ca/Ca^{2+}$ can experience calcium metal plating and possible dendrite formation, leading to possible short circuit and safety concerns. Therefore, a first threshold calcination voltage of 0.1 V was applied, which was termed a "relaxed criterion", to avoid calcium plating and potential failure of the cell. Meanwhile, a second threshold calcination voltage of 0.53 V was applied, obtained by determining the practical Sn calcination maximum as discussed above. The calcination driving force requirements for M-Ca systems could be different from Sn—Ca (although this strategy was validated above for Zn—Ca, Na—Ca, and Li—Ca systems), yielding some uncertainty in the predictions. Hence, both thresholds were used with 0.53 V serving as the restrictive criterion and the 0.1 V serving as the relaxed criterion. Each screening calculation was repeated with both thresholds to illustrate the changes that could occur with a range of calcination thresholds. Then two capacity maximums ($C_{max}$) of each M-Ca system were determined. (iv) For the two data sets obtained with different threshold calcination voltages, their output voltages, volume expansions, specific energies, and energy densities were estimated and ranked using their maximum capacities and energy densities. Cyclabilities of alloying-type anodes are usually deteriorated by a large volume expansion due to ion insertions, and M-Ca systems with lower volume expansions are then favored. M-Ca systems with a higher energy density than Sn were then screened for, yielding a list of the most suitable anode candidates.

Anode Candidates Obtained with the Relaxed Calcination Voltage Criterion

Metalloids (Si, Ge, As, Sb)

Figure 6:
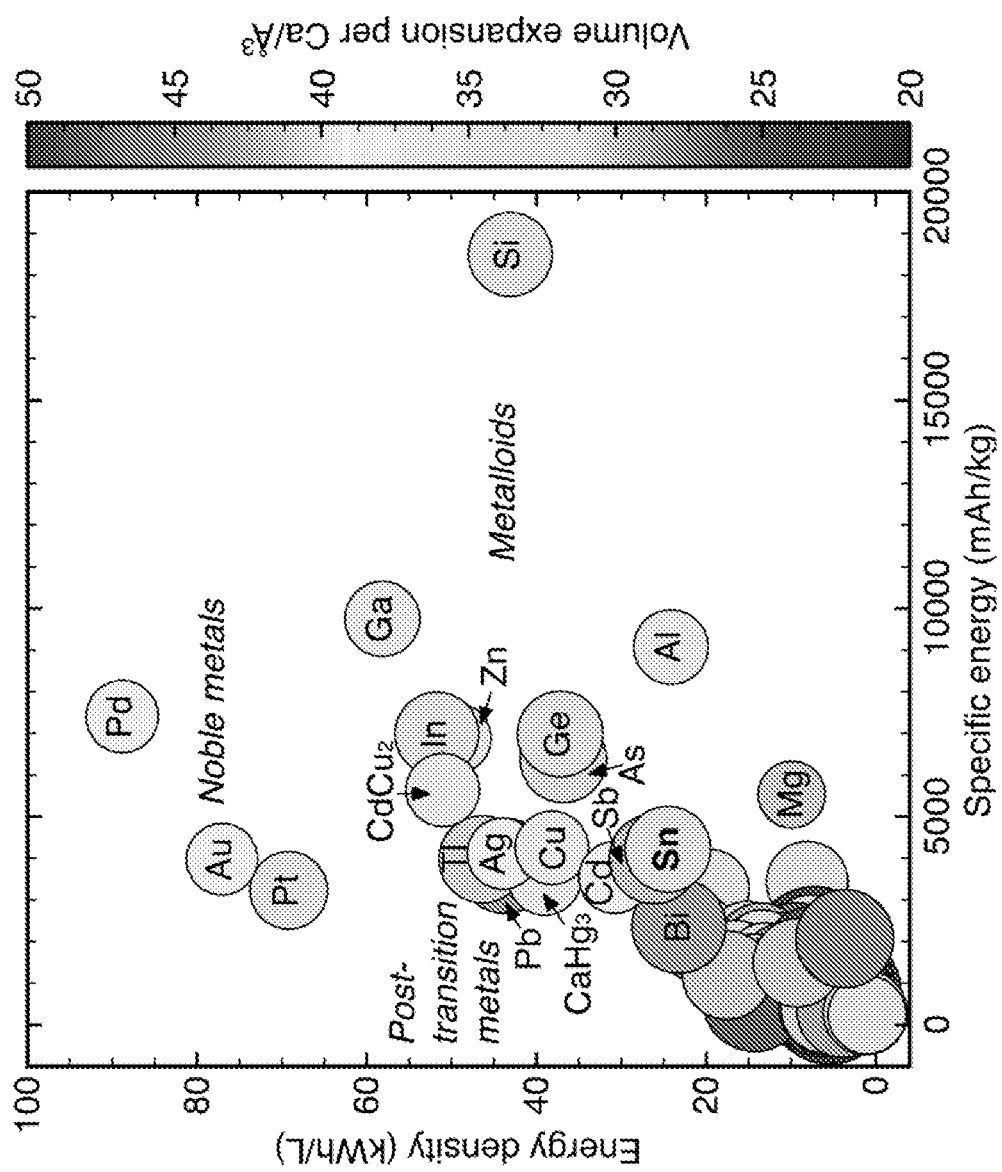
FIG. 6 shows high throughput density functional theory (HT-DFT) screening results for high performance M-Ca anodes with relaxed voltage constraint. Computational screening was performed for M-Ca alloy-type anode materials. Candidates were systems with energy densities and specific energies higher than the counterparts of Sn. The color (and size) of each marker indicates the volume expansion (inversed trend for size) per Ca. The top anode materials were metalloids (Si, Ge, As, Sb), post-transition metals (Ga, Al, In, Tl, Pb), transition metals (Cu, $CdCu_2$, Cd, Hg), including noble metals (Pd, Au, Pt, Ag).

This screening strategy identifies metalloids including Si, Ge, As, and Sb as anode materials with high specific energies and remarkably constrained volume expansions as shown in FIG. 6. Among them, Si exhibits the highest gravimetric capacity (3817 mAh/g) and specific energy (18495 Wh/kg, calculated with graphite cathode usage assumed as discussed above) in this study by taking as many as 2 Ca. These attributes are significantly larger than the analogous properties of Sn (903 mAh/g, 4216 Wh/kg) when the lower threshold voltage is applied. The average calcination voltage for the Si anode, 0.35V, is modest. Meanwhile, its maximum volume expansion is 31.89 $Å^3$ per Ca and is comparable to Sn (31.13 $Å^3$ per Ca). Ge, As, and Sb also can take a maximum amount of 2 Ca per M when the low threshold voltage was applied, and their heavier masses make their gravimetric capacities (1476 mAh/g, 1431 mAh/g, 880 mAh/g) and specific energies (6980 Wh/kg, 6371 Wh/kg, 3985 Wh/kg) slightly lower than Si, yet still comparable or higher than Sn. Moreover, Ge, As, and Sb exhibit much lower volume expansion maximums than Sn: 31.06 $Å^3$, 30.93 $Å^3$, 29.66 $Å^3$ per Ca.

Post-Transition Metals (Ga, Al, In, Tl, Pb, Hg, Cd, Zn)

Post-transition metals contain candidates among which several have been investigated experimentally as anodes of CIBs, such as Sn, Al, and Zn. Boron-group metals including Ga and Al exhibit attractive properties as alloy anodes for CIBs because of their second and third highest specific energies (9746 Wh/kg, 9071 Wh/kg) predicted in this study (following Si) as well as outstanding gravimetric and volumetric capacities. Moreover, Al has a potentially low cost, making it appealing for practical use in CIBs. The other two boron-group candidates (i.e., In and Tl) also can accommodate significant amounts of Ca ($Ca_3In$, $Ca_3Tl$) and exhibit high volumetric properties (Table 1) with volume expansions much lower than Ga and Al. Similar to In and Tl, Pb can accommodate 3 Ca per atom upon calcination with higher volumetric properties than Sn and the lowest volume expansion predicted in this study of 28.10 $Å^3$ per Ca, indicating the possibility of superior cycling performance than other candidates. Hg has been tried as a liquid-state anode for CIBs because of its low melting point; however, there are many intermetallic compounds in the Ca—Hg system that are stable at room temperature. Thus to use Hg as an anode in a practical CIB, one could start with the lowest Ca-content compound of $CaHg_3$ and control the extent of decalcination to avoid the formation of liquid Hg metal. $CaHg_3$ has slightly lower gravimetric properties than Sn yet much higher volumetric capacity (7662 mAh/mL) and energy density (38923 Wh/L). Cd has been widely used in rechargeable NiCd batteries, and here, it is shown to be a suitable candidate for CIBs with higher volumetric capacity (6227 mAh/mL) and energy density (30778 Wh/L) than Sn.

Transition Metal and Alloys (Cu, $CdCu_2$)

Cu and $CdCu_2$ feature improved energy densities compared to Sn (5637 Wh/kg, 4249 Wh/kg). Meanwhile, Cu and its alloys have remarkable electrical conductivity, which is a promising attribute for potential high-rate electrodes.

Noble Metals (Pd, Au, Pt, Ag)

Noble metal candidates (Pd, Au, Pt) exhibit the highest volumetric capacities (18141 mAh/mL, 15830 mAh/mL, 14738 mAh/mL) and energy densities (88853 Wh/L, 77078 Wh/L, 69208 Wh/L) in this study by taking significant amount of Ca per metal ($Ca_3Pd$, $Ca_3Au$, $Ca_5Pt_2$). The calcination of Pd, Au, and Pt also occurs at quite high voltages for a large concentration range (Table 3) which ensures large reaction driving forces. Ag also shows improved volumetric properties compared to Sn at relatively lower potential (0.24V). Moreover, the noble metals' superior electrical conductivity and chemical stability against corrosion make them attractive candidates for CIB anodes.

Anode Candidates Obtained with the Restrictive Calcination Voltage Criterion

Metalloids (Si, As, Sb, Ge)

Figure 7:
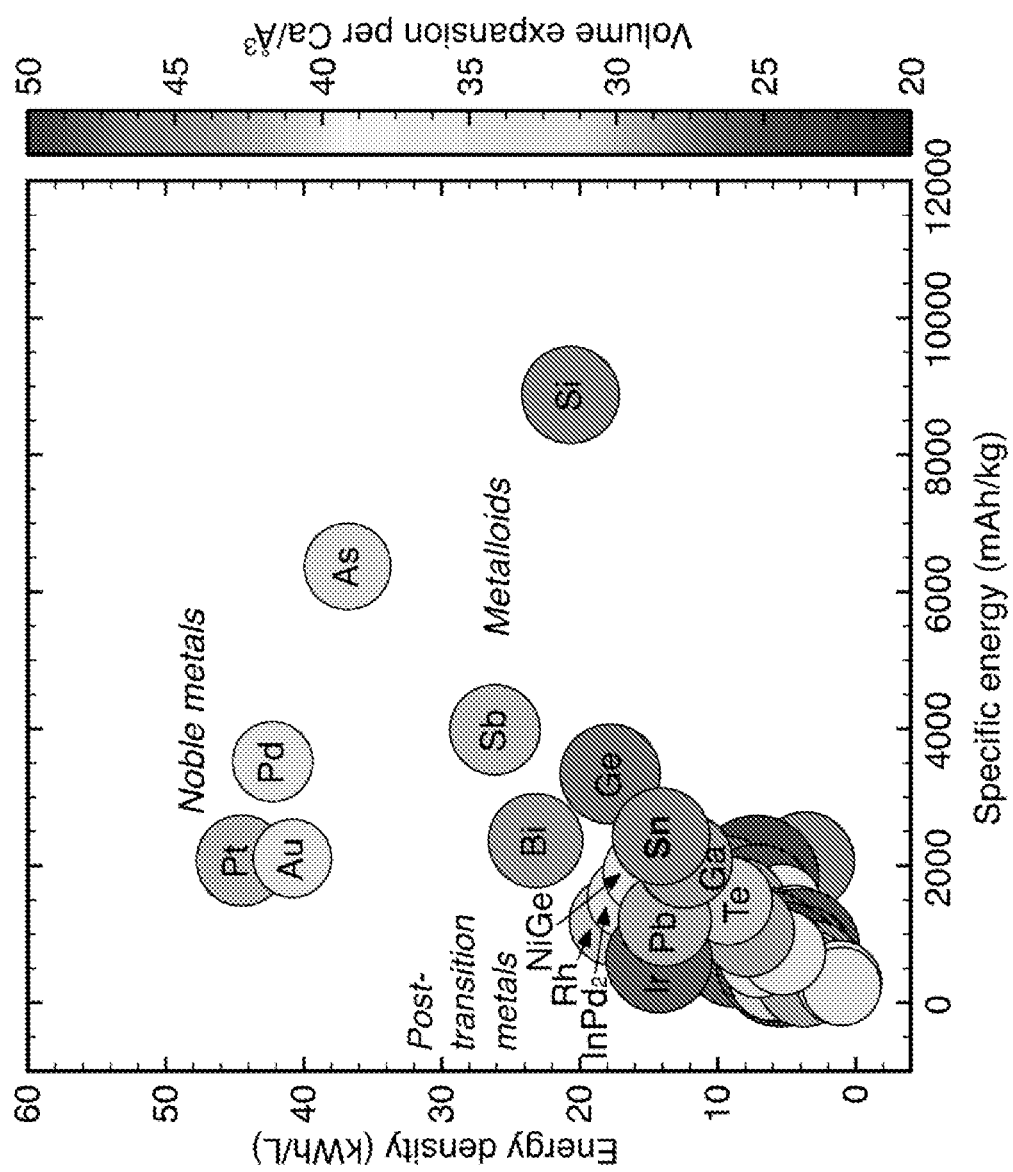
FIG. 7 shows HT-DFT screening results for high performance M-Ca anodes with restrictive voltage constraint. Computational screening was performed for M-Ca alloy-type anode materials. Candidates were systems with energy densities and specific energies higher than the counterparts of Sn. The shading (and size) of each marker indicates the volume expansion (inversed trend for size) per Ca. The top anode materials were metalloids (Si, As, Sb, Ge), post-transition metals (Bi), and noble metals (Pt, Pd, Au).

Metalloids are still the strongest anode candidates (FIG. 7 and Table 2) even with the strict voltage threshold criterion and concomitant truncated calcination reaction (Tables 3 and 4). Si, As, Sb, and Ge exhibit highest gravimetric properties (gravimetric capacity: 1908 mAh/g, 1431 mAh/g, 880 mAh/g, 738 mAh/g; specific energy: 8874 Wh/kg, 6371 Wh/kg, 3985 Wh/kg, 3340 Wh/kg), which are significantly higher than Sn (527 mAh/g, 2426 Wh/kg), while Si and Ge also show competitive volume expansions (27.6 $Å^3$, 26.9 $Å^3$ per Ca) compared to Sn (27.59 $Å^3$ per Ca).

Post-Transition Metals (Bi)

Most post-transition metals which form alloys with Ca as discussed in the previous section experience lower voltage compared with the restrictive voltage threshold. Bi emerges under the restrictive voltage threshold to be a strong candidate for a CIB anode because of its comparable gravimetric properties with Sn yet much improved volumetric properties (5031 mAh/mL, 23206 Wh/L) and constrained volume expansion of 28.37 $Å^3$ per Ca.

Noble Metals (Pt, Pd, Au)

The noble metals, Pd, Au, Pt, have relatively high voltages over wide calcination reaction extents ($Ca_5Pt_3$, $Ca_3Pd_2$, $Ca_5Au_3$) and large energy densities (44498 Wb/L, 42259 Wh/L, 40824 Wh/L) with the strict criterion of 0.53 V. Their large volume expansions also get significantly relieved after the calcination reaction truncations (Table 4).

TABLE 1

Tabulated HT-DFT screening results for high performance M-Ca alloy-type anodes with relaxed voltage constraint ($V_{threshold}$ = 0.1 V). For each candidate system, the reactant, final product, averaged voltage, gravimetric capacity, volumetric capacity, energy density, specific energy, and volume expansion maximum are shown.

| Candidates and reactions | Averaged calcination voltage (V) | Gravimetric Capacity (mAh/g) | Volumetric Capacity (mAh/mL) | Energy Density (Wh/L) | Specific Energy (Wh/kg) | Volume Expansion per Ca/$Å^3$ |
|---|---|---|---|---|---|---|
| Si + 2Ca → $Ca_2Si$ | 0.35 | 3817 | 8892 | 43089 | 18495 | 31.89 |
| Ga + 28/11Ca → 1/11$Ca_{28}Ga_{11}$ | 0.22 | 1957 | 11680 | 58178 | 9746 | 36.12 |
| Al + 13/14Ca → 1/14$Ca_{13}Al_{14}$ | 0.28 | 1845 | 4910 | 24149 | 9071 | 36.47 |
| Pd + 3Ca → $Ca_3Pd$ | 0.30 | 1511 | 18141 | 88853 | 7400 | 37.75 |
| In + 3Ca → $Ca_3In$ | 0.21 | 1400 | 10381 | 51759 | 6982 | 31.89 |

TABLE 1-continued

Tabulated HT-DFT screening results for high performance M-Ca alloy-type anodes with relaxed voltage constraint ($V_{threshold}$ = 0.1 V). For each candidate system, the reactant, final product, averaged voltage, gravimetric capacity, volumetric capacity, energy density, specific energy, and volume expansion maximum are shown.

| Candidates and reactions | Averaged calciation voltage (V) | Gravimetric Capacity (mAh/g) | Volumetric Capacity (mAh/mL) | Energy Density (Wh/L) | Specific Energy (Wh/kg) | Volume Expansion per Ca/Å$^3$ |
|---|---|---|---|---|---|---|
| Ge + 2Ca → $Ca_2Ge$ | 0.47 | 1476 | 7864 | 37195 | 6980 | 31.06 |
| Zn + 5/3Ca → $1/3Ca_5Zn_3$ | 0.16 | 1366 | 9816 | 49435 | 6881 | 39.78 |
| As + 2Ca → $Ca_2As$ | 0.75 | 1431 | 8271 | 36830 | 6371 | 30.93 |
| $CdCu_2$ + 5Ca → $Ca_5CdCu_2$ | 0.16 | 1119 | 10130 | 51056 | 5637 | 37.14 |
| Cu + Ca → CaCu | 0.16 | 843 | 7581 | 38192 | 4249 | 37.10 |
| Ag + 5/3Ca → $1/3Ca_5Ag_3$ | 0.24 | 828 | 8866 | 43982 | 4108 | 38.47 |
| Sb + 2Ca → $Ca_2Sb$ | 0.67 | 880 | 5778 | 26156 | 3985 | 29.66 |
| Au + 3Ca → $Ca_3Au$ | 0.33 | 816 | 15830 | 77078 | 3975 | 38.42 |
| Tl + 3Ca → $Ca_3Tl$ | 0.15 | 787 | 9185 | 46373 | 3972 | 30.62 |
| Pb + 3Ca → $Ca_3Pb$ | 0.28 | 776 | 8897 | 43744 | 3816 | 28.10 |
| Cd + 3/2Ca → $1/2Ca_3Cd_2$ | 0.26 | 715 | 6227 | 30788 | 3536 | 38.22 |
| Pt + 5/2Ca → $1/2Ca_5Pt_2$ | 0.50 | 687 | 14738 | 69208 | 3225 | 34.62 |
| $1/3CaHg_3$ + 8/3Ca → $Ca_3Hg$ | 0.12 | 668 | 7662 | 38923 | 3392 | 37.25 |
| Sn + 2Ca → $Ca_2Sn$ | 0.53 | 903 | 5249 | 24515 | 4216 | 31.13 |

TABLE 2

Tabulated HT-DFT screening results for high performance M-Ca alloy-type anodes with restrictive voltage constraint ($V_{threshold}$ = 0.53 V). For each candidate system, the reactant, final product, averaged voltage, gravimetric capacity, volumetric capacity, energy density, specific energy, and volume expansion maximum are shown.

| Candidates and reactions | Averaged calciation voltage (V) | Gravimetric Capacity (mAh/g) | Volumetric Capacity (mAh/mL) | Energy Density (Wh/L) | Specific Energy (Wh/kg) | Volume Expansion per Ca/Å$^3$ |
|---|---|---|---|---|---|---|
| Si + Ca → CaSi | 0.55 | 1908 | 4446 | 20673 | 8874 | 27.60 |
| As + 2Ca → $Ca_2As$ | 0.75 | 1431 | 8271 | 36830 | 6371 | 30.93 |
| Sb + 2Ca → $Ca_2Sb$ | 0.67 | 880 | 5778 | 26156 | 3985 | 29.66 |
| Pd + 3/2Ca → $1/2Ca_3Pd_2$ | 0.54 | 755 | 9070 | 42259 | 3520 | 33.50 |
| Ge + Ca → CaGe | 0.67 | 738 | 3932 | 17799 | 3340 | 26.90 |
| Bi + 2Ca → $Ca_2Bi$ | 0.59 | 513 | 5031 | 23206 | 2366 | 28.37 |
| Pt + 5/3Ca → $1/3Ca_5Pt_3$ | 0.67 | 458 | 9825 | 44498 | 2074 | 29.40 |
| Au + 5/3Ca → $1/3Ca_5Au_3$ | 0.56 | 454 | 8795 | 40824 | 2105 | 34.41 |
| Sn + 7/6Ca → $1/6Ca_7Sn_6$ | 0.59 | 527 | 3062 | 14109 | 2426 | 27.59 |

TABLE 3

Full reaction pathways for HT-DFT screening results with relaxed voltage constraint ($V_{threshold}$ = 0.1 V). For each reaction of specific candidate system, the reactant, product, voltage, gravimetric capacity, volumetric capacity, energy density, specific energy, and volume expansion are shown.

| Candidates and reactions | Calciation voltages (V) | Gravimetric Capacity (mAh/g) | Volumetric Capacity (mAh/mL) | Energy Density (Wh/L) | Specific Energy (Wh/kg) | Volume Expansion per Ca/Å$^3$ |
|---|---|---|---|---|---|---|
| Si + 1/2Ca → $1/2CaSi_2$ | 0.58 | 954 | 2223 | 10261 | 4404 | 27.29 |
| Si + 14/19Ca → $1/19Ca_{14}Si_{19}$ | 0.56 | 1406 | 3276 | 15193 | 6522 | 26.04 |
| Si + Ca → CaSi | 0.55 | 1908 | 4446 | 20673 | 8874 | 27.60 |
| Si + 5/3Ca → $1/3Ca_5Si_3$ | 0.40 | 3181 | 7410 | 35581 | 15273 | 52.32 |
| Si + 2Ca → $Ca_2Si$ | 0.35 | 3817 | 8892 | 43089 | 18495 | 31.89 |
| Ga + 1/4Ca → $1/4CaGa_4$ | 0.91 | 192 | 1147 | 4919 | 824 | 23.57 |
| Ga + 3/8Ca → $1/8Ca_3Ga_8$ | 0.83 | 288 | 1720 | 7520 | 1260 | 28.77 |
| Ga + 1/2Ca → $1/2CaGa_2$ | 0.79 | 384 | 2294 | 10118 | 1695 | 24.71 |
| Ga + 3/5Ca → $1/5Ca_3Ga_5$ | 0.70 | 461 | 2753 | 12403 | 2078 | 28.02 |
| Ga + 1Ca → CaGa | 0.48 | 769 | 4589 | 21668 | 3630 | 33.22 |
| Ga + 11/7Ca → $1/7Ca_{11}Ga_7$ | 0.33 | 1208 | 7211 | 35145 | 5888 | 35.16 |
| Ga + 5/3Ca → $1/3Ca_5Ga_3$ | 0.31 | 1281 | 7648 | 37397 | 6265 | 36.08 |
| Ga + 28/11Ca → $1/11Ca_{28}Ga_{11}$ | 0.22 | 1957 | 11680 | 58178 | 9746 | 36.12 |
| Al + 1/4Ca → $1/4CaAl_4$ | 0.50 | 497 | 1322 | 6211 | 2333 | 37.42 |
| Al + 1/2Ca → $1/2CaAl_2$ | 0.50 | 993 | 2644 | 12422 | 4666 | 31.34 |
| Al + 13/14Ca → $1/14Ca_{13}Al_{14}$ | 0.28 | 1845 | 4910 | 24149 | 9071 | 36.47 |

TABLE 3-continued

Full reaction pathways for HT-DFT screening results with relaxed voltage constraint ($V_{threshold} = 0.1$ V). For each reaction of specific candidate system, the reactant, product, voltage, gravimetric capacity, volumetric capacity, energy density, specific energy, and volume expansion are shown.

| Candidates and reactions | Calciation voltages (V) | Gravimetric Capacity (mAh/g) | Volumetric Capacity (mAh/mL) | Energy Density (Wh/L) | Specific Energy (Wh/kg) | Volume Expansion per Ca/Å³ |
|---|---|---|---|---|---|---|
| Pd + 1/5Ca → 1/5CaPd$_5$ | 1.12 | 101 | 1209 | 4938 | 411 | 23.32 |
| Pd + 1/2Ca → 1/2CaPd$_2$ | 1.07 | 252 | 3023 | 12490 | 1040 | 26.86 |
| Pd + 1Ca → CaPd | 0.69 | 504 | 6047 | 27284 | 2272 | 28.82 |
| Pd + 3/2Ca → 1/2Ca$_3$Pd$_2$ | 0.54 | 755 | 9070 | 42259 | 3520 | 33.50 |
| Pd + 5/2Ca → 1/2Ca$_5$Pd$_2$ | 0.36 | 1259 | 15117 | 73197 | 6096 | 36.90 |
| Pd + 3Ca → Ca$_3$Pd | 0.30 | 1511 | 18141 | 88853 | 7400 | 37.75 |
| In + 1/2Ca → 1/2CaIn$_2$ | 0.68 | 233 | 1730 | 7825 | 1056 | 28.76 |
| In + 1Ca → CaIn | 0.49 | 467 | 3460 | 16305 | 2200 | 31.31 |
| In + 2Ca → Ca$_2$In | 0.29 | 934 | 6921 | 33973 | 4583 | 35.94 |
| In + 8/3Ca → 1/3Ca$_8$In$_3$ | 0.24 | 1245 | 9227 | 45768 | 6174 | 36.83 |
| In + 3Ca → Ca$_3$In | 0.21 | 1400 | 10381 | 51759 | 6982 | 31.89 |
| Ge + 1/2Ca → 1/2CaGe$_2$ | 0.74 | 369 | 1966 | 8764 | 1645 | 24.91 |
| Ge + 1Ca → CaGe | 0.67 | 738 | 3932 | 17799 | 3340 | 26.90 |
| Ge + 7/6Ca → 1/6Ca$_7$Ge$_6$ | 0.51 | 861 | 4587 | 21504 | 4035 | 28.42 |
| Ge + 5/3Ca → 1/3Ca$_5$Ge$_3$ | 0.51 | 1230 | 6553 | 30720 | 5765 | 30.72 |
| Ge + 2Ca → Ca$_2$Ge | 0.47 | 1476 | 7864 | 37195 | 6980 | 31.06 |
| Zn + 1/13Ca → 1/13CaZn$_{13}$ | 1.03 | 63 | 453 | 1890 | 263 | 27.77 |
| Zn + 1/11Ca → 1/11CaZn$_{11}$ | 1.02 | 75 | 535 | 2241 | 312 | 28.53 |
| Zn + 1/5Ca → 1/5CaZn$_5$ | 0.71 | 164 | 1178 | 5293 | 737 | 31.26 |
| Zn + 1/2Ca → 1/2CaZn$_2$ | 0.46 | 410 | 2945 | 13950 | 1942 | 34.50 |
| Zn + 1Ca → CaZn | 0.26 | 820 | 5890 | 29125 | 4054 | 39.07 |
| Zn + 5/3Ca → 1/3Ca$_5$Zn$_3$ | 0.16 | 1366 | 9816 | 49435 | 6881 | 39.78 |
| As + 1/3Ca → 1/3CaAs$_3$ | 1.14 | 238 | 1378 | 5599 | 969 | 27.41 |
| As + 2/3Ca → 1/3Ca$_2$As$_3$ | 1.12 | 477 | 2757 | 11257 | 1947 | 27.25 |
| As + 1Ca → CaAs | 1.10 | 715 | 4135 | 16947 | 2932 | 31.03 |
| As + 5/3Ca → 1/3Ca$_5$As$_3$ | 0.90 | 1192 | 6892 | 29665 | 5132 | 28.63 |
| As + 2Ca → Ca$_2$As | 0.75 | 1431 | 8271 | 36830 | 6371 | 30.93 |
| CdCu$_2$ + 5Ca → Ca$_5$CdCu$_2$ | 0.16 | 1119 | 10130 | 51056 | 5637 | 37.14 |
| Cu + 1/5Ca → 1/5CaCu$_5$ | 0.41 | 169 | 1516 | 7268 | 809 | 32.14 |
| Cu + Ca → CaCu | 0.16 | 843 | 7581 | 38192 | 4249 | 37.10 |
| Ag + 2/7Ca → 1/7Ca$_2$Ag$_7$ | 0.56 | 142 | 1520 | 7055 | 659 | 33.60 |
| Ag + 3/8Ca → 1/8Ca$_3$Ag$_8$ | 0.51 | 186 | 1995 | 9363 | 875 | 34.06 |
| Ag + 1/2Ca → 1/2CaAg$_2$ | 0.46 | 248 | 2660 | 12596 | 1177 | 35.68 |
| Ag + 1Ca → CaAg | 0.35 | 497 | 5319 | 25804 | 2410 | 37.36 |
| Ag + 5/3Ca → 1/3Ca$_5$Ag$_3$ | 0.24 | 828 | 8866 | 43982 | 4108 | 38.47 |
| 1/3CaHg$_3$ + 4/9Ca → 1/9Ca$_4$Hg$_9$ | 0.46 | 28 | 319 | 1514 | 132 | 30.07 |
| 1/3CaHg$_3$ + 1/6Ca → 1/2CaHg$_2$ | 0.46 | 42 | 479 | 2270 | 198 | 31.93 |
| 1/3CaHg$_3$ + 2/3Ca → CaHg | 0.44 | 167 | 1915 | 9118 | 795 | 28.48 |
| 1/3CaHg$_3$ + 7/6Ca → 1/2Ca$_3$Hg$_2$ | 0.27 | 292 | 3352 | 16526 | 1440 | 35.36 |
| 1/3CaHg$_3$ + 4/3 Ca → 1/3Ca$_5$Hg$_3$ | 0.24 | 334 | 3831 | 19009 | 1657 | 36.02 |
| 1/3CaHg$_3$ + 8/3Ca → Ca$_3$Hg | 0.12 | 668 | 7662 | 38923 | 3392 | 37.25 |
| Sb + 1/2Ca → 1/2CaSb$_2$ | 0.93 | 220 | 1444 | 6162 | 939 | 24.81 |
| Sb + 11/10Ca → 1/10Ca$_{11}$Sb$_{10}$ | 0.92 | 484 | 3178 | 13617 | 2075 | 28.37 |
| Sb + 5/3Ca → 1/3Ca$_5$Sb$_3$ | 0.80 | 734 | 4815 | 21190 | 3229 | 31.14 |
| Sb + 2Ca → Ca$_2$Sb | 0.67 | 880 | 5778 | 26156 | 3985 | 29.66 |
| Au + 1/5Ca → 1/5CaAu$_5$ | 1.26 | 54 | 1055 | 4159 | 214 | 31.91 |
| Au + 1/2Ca → 1/2CaAu$_2$ | 1.08 | 136 | 2638 | 10870 | 561 | 32.08 |
| Au + 3/4Ca → 1/4Ca$_3$Au$_4$ | 0.93 | 204 | 3958 | 16907 | 872 | 31.14 |
| Au + 1Ca → CaAu | 0.82 | 272 | 5277 | 23107 | 1192 | 33.32 |
| Au + 5/4Ca → 1/4Ca$_5$Au$_4$ | 0.70 | 340 | 6596 | 29688 | 1531 | 33.50 |
| Au + 5/3Ca → 1/3Ca$_5$Au$_3$ | 0.56 | 454 | 8795 | 40824 | 2105 | 34.41 |
| Au + 7/3Ca → 1/3Ca$_7$Au$_3$ | 0.42 | 635 | 12312 | 58915 | 3038 | 37.30 |
| Au + 5/2Ca → 1/2Ca$_5$Au$_2$ | 0.40 | 680 | 13192 | 63387 | 3269 | 37.35 |
| Au + 3Ca → Ca$_3$Au | 0.33 | 816 | 15830 | 77078 | 3975 | 38.42 |
| Tl + 1/3Ca → 1/3CaTl$_3$ | 0.48 | 87 | 1021 | 4818 | 413 | 23.11 |
| Tl + 3/5Ca → 1/5Ca$_3$Tl$_5$ | 0.46 | 157 | 1837 | 8703 | 745 | 27.28 |
| Tl + 1Ca → CaTl | 0.45 | 262 | 3062 | 14533 | 1245 | 27.86 |
| Tl + 3Ca → Ca$_3$Tl | 0.15 | 787 | 9185 | 46373 | 3972 | 30.62 |
| Pb + 1/3Ca → 1/3CaPb$_3$ | 0.67 | 86 | 989 | 4474 | 390 | 27.40 |
| Pb + 1Ca → CaPb | 0.53 | 259 | 2966 | 13846 | 1208 | 28.81 |
| Pb + 5/3Ca → 1/3Ca$_5$Pb$_3$ | 0.45 | 431 | 4943 | 23497 | 2050 | 35.53 |
| Pb + 2Ca → Ca$_2$Pb | 0.43 | 517 | 5931 | 28321 | 2470 | 34.64 |
| Pb + 3Ca → Ca$_3$Pb | 0.28 | 776 | 8897 | 43744 | 3816 | 28.10 |
| Cd + 1/2Ca → 1/2CaCd$_2$ | 0.53 | 238 | 2076 | 9700 | 1114 | 35.54 |
| Cd + 1Ca → CaCd | 0.37 | 477 | 4152 | 20035 | 2301 | 35.14 |
| Cd + 3/2Ca → 1/2Ca$_3$Cd$_2$ | 0.26 | 715 | 6227 | 30788 | 3536 | 38.22 |
| Pt + 1/5Ca → 1/5CaPt$_5$ | 1.60 | 55 | 1179 | 4242 | 198 | 31.66 |
| Pt + 1/2Ca → 1/2CaPt$_2$ | 1.43 | 137 | 2948 | 11124 | 518 | 24.63 |
| Pt + 3/2Ca → 1/2Ca$_3$Pt$_2$ | 0.73 | 412 | 8843 | 39553 | 1843 | 31.83 |
| Pt + 5/3Ca → 1/3Ca$_5$Pt$_3$ | 0.67 | 458 | 9825 | 44498 | 2074 | 29.40 |
| Pt + 5/2Ca → 1/2Ca$_5$Pt$_2$ | 0.50 | 687 | 14738 | 69208 | 3225 | 34.62 |

TABLE 3-continued

Full reaction pathways for HT-DFT screening results with relaxed voltage constraint ($V_{threshold} = 0.1$ V). For each reaction of specific candidate system, the reactant, product, voltage, gravimetric capacity, volumetric capacity, energy density, specific energy, and volume expansion are shown.

| Candidates and reactions | Calciation voltages (V) | Gravimetric Capacity (mAh/g) | Volumetric Capacity (mAh/mL) | Energy Density (Wh/L) | Specific Energy (Wh/kg) | Volume Expansion per Ca/Å$^3$ |
|---|---|---|---|---|---|---|
| Sn + 1/3Ca → 1/2CaSn$_3$ | 0.99 | 150 | 875 | 3682 | 633 | 7.43 |
| Sn + 1Ca → CaSn | 0.72 | 451 | 2624 | 11746 | 2020 | 27.51 |
| Sn + 7/6Ca → 1/6Ca$_2$Sn$_6$ | 0.59 | 527 | 3062 | 14109 | 2426 | 27.59 |
| Sn + 31/20Ca → 1/20Ca$_{31}$Sn$_{20}$ | 0.59 | 700 | 4068 | 18744 | 3224 | 28.87 |
| Sn + 36/23Ca → 1/23Ca$_{36}$Sn$_{23}$ | 0.53 | 706 | 4108 | 19185 | 3300 | 27.99 |
| Sn + 2Ca → Ca$_2$Sn | 0.53 | 903 | 5249 | 24515 | 4216 | 31.13 |

TABLE 4

Full reaction pathways for HT-DFT screening results with restrictive voltage constraint ($V_{threshold} = 0.53$ V). For each reaction of specific candidate system, the reactant, product, voltage, gravimetric capacity, volumetric capacity, energy density, specific energy, and volume expansion are shown.

| Candidates and reactions | Calciation voltages (V) | Gravimetric Capacity (mAh/g) | Volumetric Capacity (mAh/mL) | Energy Density (Wh/L) | Specific Energy (Wh/kg) | Volume Expansion per Ca/Å$^3$ |
|---|---|---|---|---|---|---|
| Si + 1/2Ca → 1/2CaSi$_2$ | 0.58 | 954 | 2223 | 10261 | 4404 | 27.29 |
| Si + 14/19Ca → 1/19Ca$_{14}$Si$_{19}$ | 0.56 | 1406 | 3276 | 15193 | 6522 | 26.04 |
| Si + Ca → CaSi | 0.55 | 1908 | 4446 | 20673 | 8874 | 27.60 |
| As + 1/3Ca → 1/3CaAs$_3$ | 1.14 | 238 | 1378 | 5599 | 969 | 27.41 |
| As + 2/3Ca → 1/3Ca$_2$As$_3$ | 1.12 | 477 | 2757 | 11257 | 1947 | 27.25 |
| As + 1Ca → CaAs | 1.10 | 715 | 4135 | 16947 | 2932 | 31.03 |
| As + 5/3Ca → 1/3Ca$_5$As$_3$ | 0.90 | 1192 | 6892 | 29665 | 5132 | 28.63 |
| As + 2Ca → Ca$_2$As | 0.75 | 1431 | 8271 | 36830 | 6371 | 30.93 |
| Sb + 1/2Ca → 1/2CaSb$_2$ | 0.93 | 220 | 1444 | 6162 | 939 | 24.81 |
| Sb + 11/10Ca → 1/10Ca$_{11}$Sb$_{10}$ | 0.92 | 484 | 3178 | 13617 | 2075 | 28.37 |
| Sb + 5/3Ca → 1/3Ca$_5$Sb$_3$ | 0.80 | 734 | 4815 | 21190 | 3229 | 31.14 |
| Sb + 2Ca → Ca$_2$Sb | 0.67 | 880 | 5778 | 26156 | 3985 | 29.66 |
| Pd + 1/5Ca → 1/5CaPd$_5$ | 1.12 | 101 | 1209 | 4938 | 411 | 23.32 |
| Pd + 1/2Ca → 1/2CaPd$_2$ | 1.07 | 252 | 3023 | 12490 | 1040 | 26.86 |
| Pd + 1Ca → CaPd | 0.69 | 504 | 6047 | 27284 | 2272 | 28.82 |
| Pd + 3/2Ca → 1/2Ca$_3$Pd$_2$ | 0.54 | 755 | 9070 | 42259 | 3520 | 33.50 |
| Ge + 1/2Ca → 1/2CaGe$_2$ | 0.74 | 369 | 1966 | 8764 | 1645 | 24.91 |
| Ge + 1Ca → CaGe | 0.67 | 738 | 3932 | 17799 | 3340 | 26.90 |
| Bi + 11/10Ca → 1/10Ca$_{11}$Bi$_{10}$ | 0.79 | 282 | 2767 | 12199 | 1244 | 28.21 |
| Bi + 5/3Ca → 1/3Ca$_5$Bi$_3$ | 0.68 | 427 | 4192 | 18932 | 1930 | 30.61 |
| Bi + 2Ca → Ca$_2$Bi | 0.59 | 513 | 5031 | 23206 | 2366 | 28.37 |
| Pt + 1/5Ca → 1/5CaPt$_5$ | 1.60 | 55 | 1179 | 4242 | 198 | 31.66 |
| Pt + 1/2Ca → 1/2CaPt$_2$ | 1.43 | 137 | 2948 | 11124 | 518 | 24.63 |
| Pt + 3/2Ca → 1/2Ca$_3$Pt$_2$ | 0.73 | 412 | 8843 | 39553 | 1843 | 31.83 |
| Pt + 5/3Ca → 1/3Ca$_5$Pt$_3$ | 0.67 | 458 | 9825 | 44498 | 2074 | 29.40 |
| Au + 1/5Ca → 1/5CaAu$_5$ | 1.26 | 54 | 1055 | 4159 | 214 | 31.91 |
| Au + 1/2Ca → 1/2CaAu$_2$ | 1.08 | 136 | 2638 | 10870 | 561 | 32.08 |
| Au + 3/4Ca → 1/4Ca$_3$Au$_4$ | 0.93 | 204 | 3958 | 16907 | 872 | 31.14 |
| Au + 1Ca → CaAu | 0.82 | 272 | 5277 | 23107 | 1192 | 33.32 |
| Au + 5/4Ca → 1/4Ca$_5$Au$_4$ | 0.70 | 340 | 6596 | 29688 | 1531 | 33.50 |
| Au + 5/3Ca → 1/3Ca$_5$Au$_3$ | 0.56 | 454 | 8795 | 40824 | 2105 | 34.41 |
| Sn + 1/3Ca → 1/3CaSn$_3$ | 0.99 | 150 | 875 | 3682 | 633 | 7.43 |
| Sn + 1Ca → CaSn | 0.72 | 451 | 2624 | 11746 | 2020 | 27.51 |
| Sn + 7/6Ca → 1/6Ca$_7$Sn$_6$ | 0.59 | 527 | 3062 | 14109 | 2426 | 27.59 |

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A calcium ion battery comprising:
an anode comprising an intermetallic compound of calcium and a metal or metalloid, wherein the metal or metalloid is antimony, arsenic, copper, cadmium, bismuth, silver, gold, palladium, platinum, or $CdCu_2$;

a cathode in electrical communication with the anode; and an electrolyte comprising a calcium salt disposed between the anode and the cathode.

2. The battery of claim 1, wherein the intermetallic compound is an intermetallic compound of calcium and a pnictogen selected from the group consisting of arsenic, antimony, and bismuth.

3. The battery of claim 2, wherein the pnictogen is arsenic.

4. The battery of claim 2, wherein the pnictogen is antimony.

5. The battery of claim 2, wherein the pnictogen is bismuth.

6. The battery of claim 1, wherein the intermetallic compound is an intermetallic compound of calcium and a transition metal selected from the group consisting of palladium, platinum, gold, copper, cadmium, gold, and mercury.

7. The battery of claim 6, wherein the transition metal is a noble metal selected from the group consisting of palladium, platinum, gold, and silver.

8. The battery of claim 7, wherein the noble metal is palladium.

9. The battery of claim 7, wherein the noble metal is platinum.

10. The battery of claim 7, wherein the noble metal is gold.

11. The battery of claim 7, wherein the noble metal is silver.

12. The battery of claim 6, wherein the transition metal is copper.

13. The battery of claim 6, wherein the transition metal is cadmium.

14. The battery of claim 6, wherein the intermetallic compound is an intermetallic compound of calcium and $CdCu_2$.

* * * * *